United States Patent [19]
Jain et al.

[11] Patent Number: 5,386,562
[45] Date of Patent: Jan. 31, 1995

[54] CIRCULAR SCHEDULING METHOD AND APPARATUS FOR EXECUTING COMPUTER PROGRAMS BY MOVING INDEPENDENT INSTRUCTIONS OUT OF A LOOP

[75] Inventors: Suneel Jain, San Jose; Frederick Chow, Cupertino; Sun Chan, Fremont; Sin S. Lew, San Jose, all of Calif.

[73] Assignee: MIPS Computer Systems, Inc., Sunnyvale, Calif.

[21] Appl. No.: 882,427

[22] Filed: May 13, 1992

[51] Int. Cl.6 ............................ G06F 9/30; G06F 9/00
[52] U.S. Cl. ............................ 395/650; 364/DIG. 1; 364/262.1; 364/281.8; 364/259.5; 364/261; 364/238.8; 395/700; 395/375
[58] Field of Search ...................... 395/375, 650, 700

[56] References Cited

U.S. PATENT DOCUMENTS

| | | | |
|---|---|---|---|
| 4,782,444 | 11/1986 | Munshi et al. | 395/700 |
| 5,083,267 | 1/1992 | Rau et al. | 395/375 |
| 5,109,331 | 4/1992 | Ishida et al. | 395/375 |
| 5,202,975 | 4/1993 | Rasbold et al. | 395/600 |
| 5,226,128 | 7/1993 | Rau et al. | 395/375 |
| 5,274,812 | 12/1993 | Inoue | 395/700 |

OTHER PUBLICATIONS

Ebcioglu, "A Compilation Technique for Software Pipelining of Loops with Conditional Jumps" *Proceedings of the 20th Annual Workshop on Microprogramming*, pp. 69–79 (1987).
Ferante, "What's in a Name, or the Value of Renaming for Parallelism Detection and Storage Allocation", *Technical Report #12157, IBM Thomas J. Watson Research Center*, (1987).
Weiss, et al., "A Study of Scalar Compilation Techniques for Pipelined Supercomputer", *Proc. 2nd International Conf. on Architectural Support for Programming Languages and Operating Systems*, (1987).
Lam, "Software Pipelining: An Effective Scheduling Technique for VLIW Machines", *Proc. ACM SIGPLAN Conf.*, (1988).
Dehnert, et al., "Overlapped Loop Support in the Cydra 5", *Proc. 3rd International Conf. on Architectural Support for Programming Languages and Operating Systems*, (1988).
Ebcioglu, et al., "A New Compilation Technique for Parallelizing Loops with Unpredictable Branches on a VLIW Architecture", *Languages and Compilers for Parallel Computing*, pp. 213–229 (1990).
Ebcioglu, "Research Report–Some Global Compiler Optimizations and Architectural Features for Improving Performance of Superscalars" *Computer Science* (1990).
Jain, "Circular Scheduling–A New Technique to Perform Software Pipelining" *ACM Sigplan 91'Conf. on Programming Language Design and Implementation*, (1991).
Hennesy, et al., *Computer Architecture, A Quantitative Approach*, pp. 314–318, 325–328 (1960).
Tomasulo, "An Efficient Algorithm for Exploiting Multiple Arithmetic Units", *IBM Journal*, pp. 25–33, (1967).
Rau, et al., "Some Scheduling Techniques and an Easily Schedulable Horizontal Architecture for High Perfor- (List continued on next page.)

*Primary Examiner*—Eddie P. Chan
*Attorney, Agent, or Firm*—Townsend and Townsend Khourie and Crew

[57] ABSTRACT

A procedure which is a particular type of software pipelining is provided which increases the efficiency with which code is executed by reducing or eliminating stalls such as by filling delay slots. The process includes moving instructions in a loop from one loop iteration to another. The moving of instructions provides the scheduler with additional independent instructions in a given basic block so the scheduler has greater freedom to move instructions into unfilled delay slots. The procedure includes changing the entry point into the loop, thus effectively moving an instruction from near the top of the loop to near the bottom of the loop, while changing the iteration number of the moved instruction.

15 Claims, 9 Drawing Sheets

OTHER PUBLICATIONS mance Scientific Computing", *Micro*, pp. 183–198 (1981).

Charlesworth, "An Approach to Scientific Array Processing: The Architectural Design of the AP–120B/FPS–164 Family" *Computer*, pp. 18–27 (1981).

Hennessy, et al., "Postpass Code Optimization of Pipeline Constraints", *ACM Transactions on Programming Languages and Systems*, vol. 5, No. 3, (1983).

Touzeau, et al., "A Fortran Compiler for 5he FPS–164 Scientific Comp;uter", *Proceedings of the ACM SIGPLAN Symposium on Compiler Construction–SIGPLAN Notices*, vol. 19, No. 6, (1984).

Gibbons, et al. "Efficient Instruction Scheduling for a Pipelined Architecture", *Proceedings of the Sigplan Symposium on Compiler Construction*, pp. 11–16 (1986).

Chow, et al., "Engineering a RISC Compiler System", *Proceedings of COMPCON*, pp. 204–209, (1986).

Su, et al., "URPR–An Extensionof URCR for Software Pipelining", *19th Annual Workshop of Microprogramming*, pp. 94–103, (1986).

Bodin, et al., "Loop Optimization for Horizontal Microcoded Machines", *Proc. International Conf. on Supercomputing*, pp. 164–176, (1986).

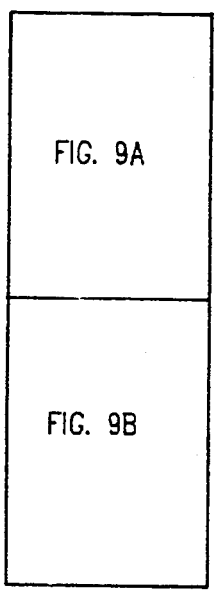
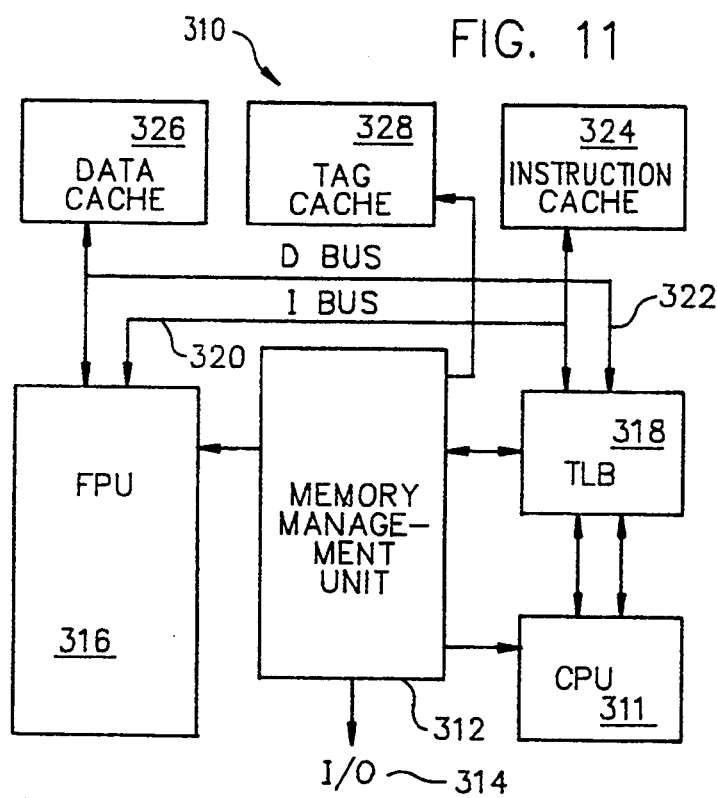
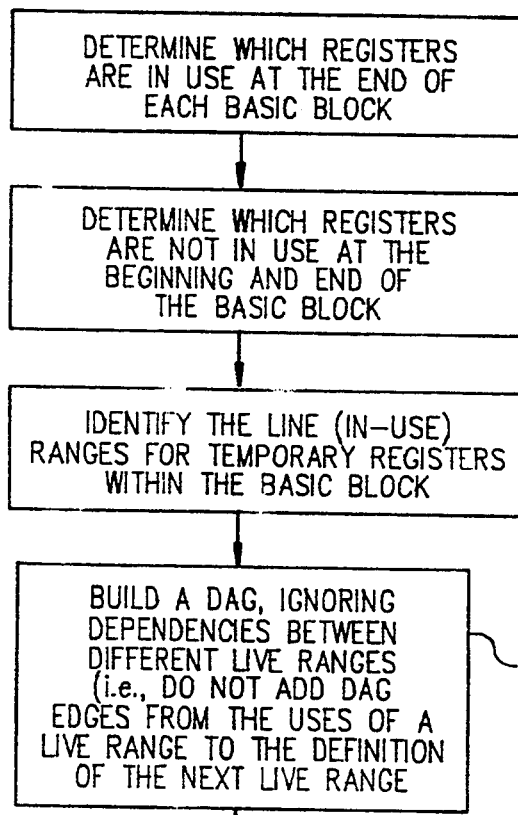
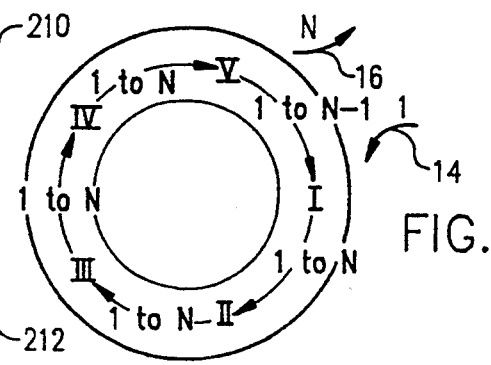
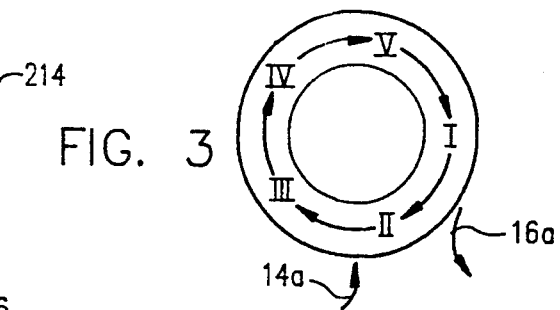
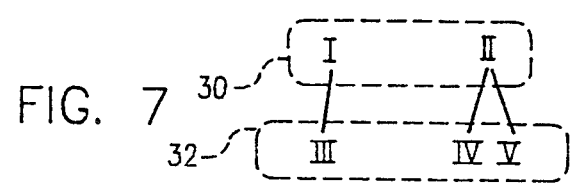

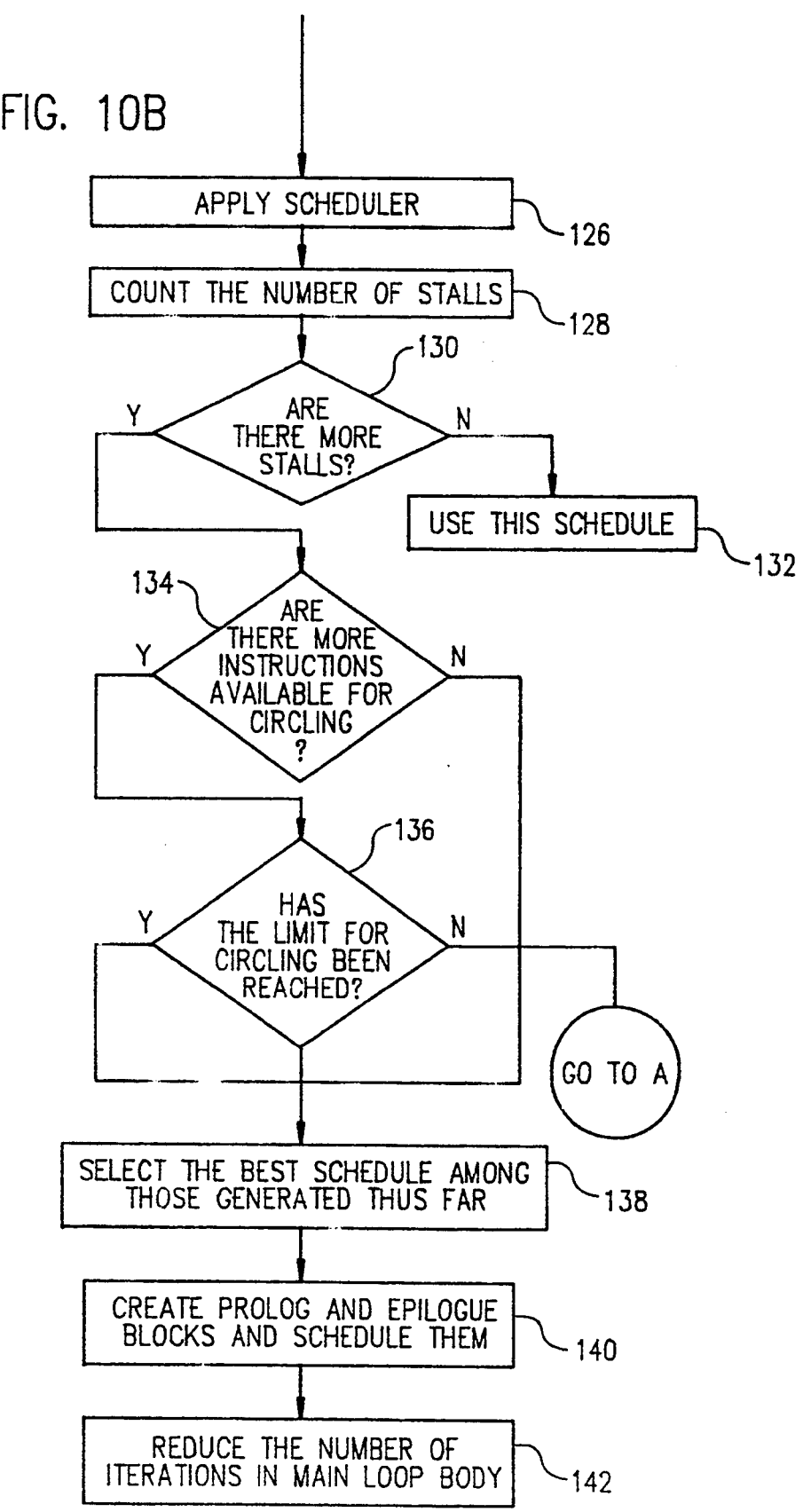

CIRCULAR SCHEDULING METHOD AND APPARATUS FOR EXECUTING COMPUTER PROGRAMS BY MOVING INDEPENDENT INSTRUCTIONS OUT OF A LOOP

BACKGROUND OF THE INVENTION

The present invention relates to a method and apparatus for increasing efficiency of executing computer programs and in particular for moving object language instructions to reduce stalled cycles.

When a compiler is used to produce object code from a source code program, a portion of the compiler, known as the instruction scheduler, establishes the order in which at least some of the instructions will be performed. At least some types of schedulers will schedule instructions in an order different from the apparent order the instructions had prior to the work by the scheduler. One of the purposes of changing the order of instructions is to reduce the occurrence of stalled cycles such as unfilled delay slots. Delay slots occur following instructions which require several cycles to complete. In typical computers, multiply and divide operations are examples of operations which may take multiple cycles to complete. In many devices the execution apparatus such as the arithmetic logic unit (ALU) could be idle during the delay slots, e.g. if the instruction following the instruction which caused the delay slots depends on the previous instruction (i.e., requires addresses, data or other information provided by the previous instruction). Some types of schedulers will attempt to fill one or more of these delay slots. The scheduler will fill the delay slots by identifying an instruction (typically a later instruction) which does not depend from the instruction that caused the delay slots. This "independent" instruction (i.e., an instruction which is not dependent from the instruction that caused the delay slots) can be worked on by the execution unit during the delay slot, thereby filling one of the delay slots. Since idle cycles of the execution unit represent inefficiency, the number of unfilled delay slots should be reduced or minimized in order to increase the efficiency with which the computer program is executed.

The process by which delay slots are filled must be carefully designed to avoids moving instructions in a manner that changes the result of the computer program. Also, the scheduler must not be so complex that the time required for compilation outweighs the benefits from increased efficiency of execution. Many types of schedulers move instructions only within a "basic block" section of code (a section of linear code without loops or branches, i.e., with a single entrance and single exit point). In previous devices and processes, there have often been a number of unfilled delay slots because the scheduler was unable to identify sufficient independent instructions within a given basic block to fill all delay slots. As noted above, this led to some inefficiency in the execution of programs.

SUMMARY OF THE INVENTION

The present invention recognizes the problem of inefficiency of execution and provides for a reduction in inefficiency by moving instructions. According to the present invention, programming loops within the program are viewed as having a circular structure, with the nominally "first" instruction following the nominally "last" instruction in the loop. In one embodiment the point in this circular structure at which the loop is entered is moved to a point along the circle different from the point between the last instruction and the first instruction. This effectively moves an instruction from the top of the loop to the bottom. This effect is achieved by moving one or more iterations of one or more instructions out of the loop (i.e., to a point preceding initiation of the loop) and moving corresponding instructions from subsequent iterations to previous iterations of the loop. In this way, executing one circuit of the loop involves executing instructions that were originally in different iterations of the loop.

The invention also includes generalizations of this procedure. It is not necessary that the instructions which are moved are those at the "top" of the loop. Nor is it necessary that these instructions be moved to the "bottom" of the loop. A given loop instruction may be subjected to this procedure more than once. For example, the first two iterations of a given loop instructions may be moved outside the loop and corresponding instructions in subsequent iterations will be moved forward two iterations.

After the moving of loop instructions is completed, the scheduler can operate on the rearranged loop instructions. According to one embodiment, little or no change needs to be made to the scheduler which can be a known type of scheduler such as those disclosed in F. Chong, et al., "Engineering a Risc Compiler System", *Proceedings Compcon, IEEE*, March, 1986; T. R. Gross, et al., "Post Pass Code Optimization of Pipeline Constraints", *ACM Transactions on Programming Languages and Systems*, July, 1983, or P. B. Gibbons, et al., "Efficient Instructions Scheduling for a Pipelined Architecture", *Proceedings of the Sigplan Symposium on Compiler construction*, June, 1986. In one embodiment, several different rearranged versions of the loop are processed by the scheduler and the outcome which appears to be most efficient is used for executing the program. Preferably the described circular scheduling is used in conjunction with register renaming and/or loop unrolling.

BRIEF DESCRIPTION OF THE DRAWINGS

FIG. 2 depicts the circular structure of instructions in programming loops;

FIG. 3 is a schematic diagram depicting movement of the entry and exit points in a programming loop;

FIG. 7 is a schematic diagram depicting the relationship of instructions after register renaming;

FIG. 11 depicts, schematically, a computer which can be used in connection with the present invention.

DETAILED DESCRIPTION OF THE PREFERRED EMBODIMENTS

Figure 1:
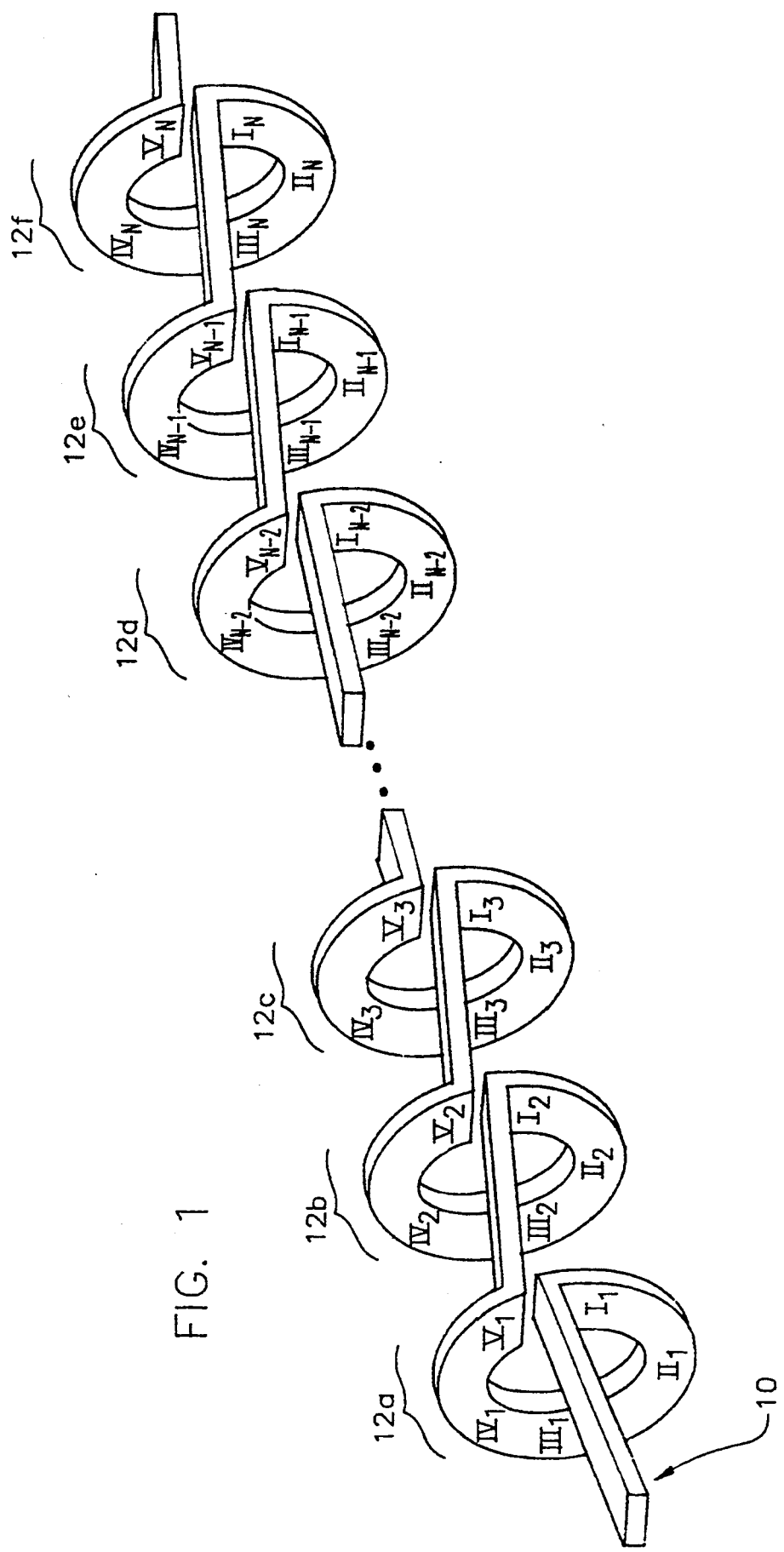
FIG. 1 is a schematic view of instructions in multiple iterations of a programming loop.

One of the embodiments the present invention is directed particularly to changing the order of instructions in a programming loop prior to scheduling. In this context, a loop is a portion of code that has a beginning or entrance section and an ending or exit section wherein, upon reaching the exit, the program flow returns back to the entrance section at least once. Each pass through this section of the code from the entrance portion to the exit portion is an iteration of the loop. Typically, looping will continue either a predetermined number of times or until a predetermined condition is satisfied. Often a variable is used to indicate which iteration of the loop is being executed and one or more instructions in the loop may depend on the iteration number (e.g., to calculate an array index). An example of a programming loop is a loop intended to add a constant to all the elements of an array. This could be expressed in source code (using C-type notation) as:

$$\text{for } (i = 0; i < N; i = i + 1)$$
$$x[i] = x[i] + C;$$

As noted above, the compiler will generate object code based on this source code. An example of object code generated by a previous compiler, before being worked on by the scheduler, expressed in notion for the MIPS R-6000/R-6010 microprocessor, is shown below:

| LOOP: | |
|---|---|
| ldc1 | $f4,0(r3) |
| addiu | r3,r3,8 |
| add.d | $f6,$f4,$f12 |
| < 3 cycle interlock > | |
| sdc1 | $f6,−8(r3) |
| bne | r3,r2,LOOP |

Table 1 summarizes these instructions. Schedulers of the previous type might move instructions, such as moving "bne" into one of the interlock cycles, to provide the following:

| LOOP: | |
|---|---|
| ldc1 | $f4,0(r3) |
| addiu | r3,r3,8 |
| add.d | $f6,$f4,$f12 |
| bne | r3,r2,LOOP |
| < 2 cycle interlock > | |
| sdc1 | $f6,−8(r3) |

Table I summarizes these instructions. It can be seen that according to previous approaches the scheduler may be able to eliminate some stalls (e.g., by filling some delay slots or cycle interlocks) but some delay slots remain unfilled. In the above example, the SDC1 instruction cannot be moved into the delay slots since the add instruction (which stores results into f6) must be completed before the store instruction (which stores the contents of f6) is conducted.

The instructions in the loop shown in Table 1 (Roman numeral I, II, III, IV, V) will be repeated during each iteration of the loop. Typically, the object code will not specify each of these instructions individually but will use a branching instruction as described above, to achieve this result. For example, using subscripts to indicate the iteration number, if this loop is repeated N times, when the code is executed, the instructions would be executed in the following manner:

$I_1,II_1,III_1,IV_1,V_1,I_2,II_2,III_2,IV_2,V_2,$
$I_3,II_3,III_3,IV_3,V_3, \quad . \quad . \quad . \quad I_{N-1},II_{N-1},III_{N-1},IV_{N-1},V_{N-1},$
$I_N,II_N,III_N,IV_N,V_N$

TABLE 1

| Instruction Number | Object Code | Meaning |
|---|---|---|
| I | ldc1 $f4,0(r3) | Take the value stored in the address indicated by the contents of register r3, after augmenting the address by 0, and store it in variable f4 |
| II | addiu $r3,r3,8 | Increment the contents of register r3 by 8 and store back into r3 |
| III | add.d $f6,$f4,$f12 | Add, double precision, the numbers in variables f4 and f12 (f12 was previously defined as the constant "c") and store in f6 |
| IV | sdc1 $f6,−8(r3) | Store the value in variable f6 in the memory location indicated by the address in r3, after decrementing the address by 8. |
| V | bne r3,r2,LOOP | If the contents of r3 is not equal to the contents of r2, branch to the program location indicated by the marker "LOOP", otherwise, exit the loop. |

The instruction stream as executed is schematically illustrated in FIG. 1. In this figure, a looped line shows the flow of instructions, from lower left to upper right, with the instructions being indicated along the line using the notation above. The loop shown in FIG. 1 includes N iterations 12a–12f. The structure of the loop can be viewed as being circular as depicted in FIG. 2 (which is conceptually similar to looking along the axis of FIG. 1). The labels on the arrows in FIG. 2 indicate during which iteration the flow of instructions occurs in the direction of the arrows. As shown in FIG. 2 during the first iteration 14 program flow enters the loop at instruction I. During all iterations (1 to N) flow proceeds from instruction I to II, thence to III, IV and V. After instruction V, the instruction flow returns to I for iterations 1 to N−1. For the Nth iteration, following V, program flow exits the loop 16. It is the return from instruction V to I (albeit with a change of iteration number) that makes the loop structure circular.

The present invention involves the concept that, since the loop structure is circular, it may be possible to enter the loop at a point other than between V and I. It has been found that with adjustments of this type, particularly before the scheduler is used, it is possible to achieve more efficient loop processing, such as by filling additional delay slots. FIG. 3 depicts entering the loop 14a at a point between I and II. FIG. 3 does not depict the iteration numbers since other adjustments must be made in order to permit this scheme to work, as described below.

As seen in FIG. 3, by moving the entry and exit point of the circular loop, the order of instructions is shifted from I, II, III, IV, V to II, III, IV, V, I. That is, effectively the instruction at the beginning or "top" (i.e., I) is moved to the end or "bottom" of the loop. Referring back to Table 1, it can be seen that in a typical loop moving I in this fashion requires additional adjustments. For example, moving I to the bottom of the loop, without further adjustments, will result in executing instruction III, (which adds the variables in f4 and f12) before instruction I, (which loads the desired data into f4).

Figure 4:
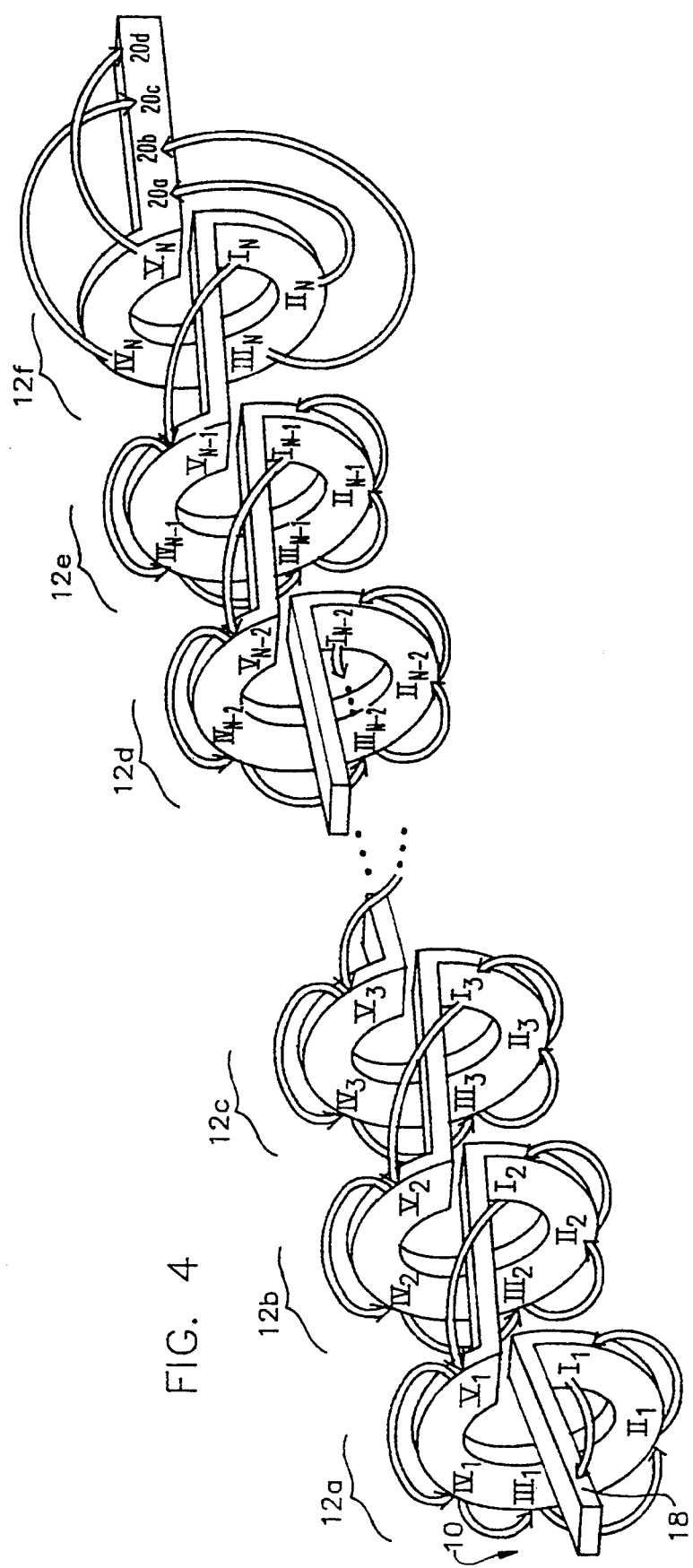
FIG. 4 is a schematic diagram depicting how instructions in a programming loop are moved according to one embodiment of the present invention.

FIG. 4 depicts a manner of making adjustments so that the desired order instructions can be achieved. In FIG. 4, the double-lined arrows show how the instructions are to be moved. The result of this movement is depicted in FIG. 5.

It should be understood that although the present description is in terms of movement of instructions, it is not necessary that instructions be physically moved, i.e., written to a new location in memory. The same effect can be achieved by using pointers or flags or adjusting addresses so as to select the order in which instructions are executed and references herein to "moving" instructions is to be understood to include such techniques.

The movement of instructions in FIG. 4 can be summarized as follows. $I_1$ is moved outside the loop, i.e., to a position 18 which precedes the initiation of the loop. In each iteration 1-N-1, (12a-12e) instructions II, III, IV and V are moved forward one position. Thus, $II_1$ replaces $I_1$. $II_2$ replaces $I_2$. Similarly, $III_1$ replaces $II_1$. $IV_1$ replaces $III_1$, and $V_1$ replaces $IV_1$. In each iteration 1-N-1, the position formerly occupied by V will be replaced by instruction I from the next iteration. I.e., the position of $V_1$ will be replaced by $I_2$. The position of $V_2$ will be replaced by $I_3$. The position of $V_{N-1}$ will be replaced by $I_N$. Of the instructions in the last (Nth) iteration, as noted above $I_N$ will be moved forward to the N-1th iteration and replace $V_{N-1}$. The remaining instructions in the last iteration (instructions $II_N$, $III_N$, $IV_N$, $V_N$) will be moved outside the loop to positions 20a, b, c, d, following the loop. Thus, it can be seen that all instructions from the last iteration 12e are moved out of that iteration. Accordingly, the number of iterations in the loop is reduced from N to N-1.

Figure 5:
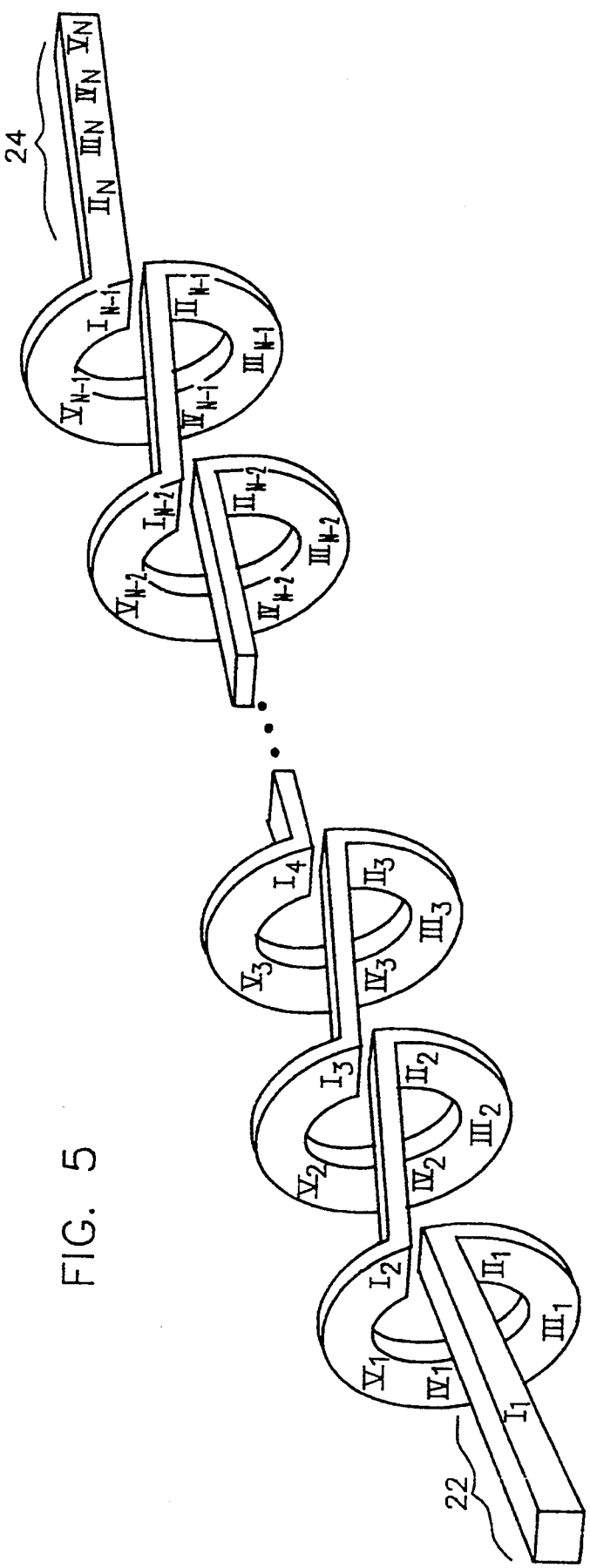
FIG. 5 depicts the location of structures before, in and after the programming loop following movement of instructions as depicted in FIG. 4.

The adjustment illustrated in FIG. 5 can be extended, for example, to move both I and II to the bottom of the loop. This type of adjustment is depicted in FIG. 6.

Figure 6:
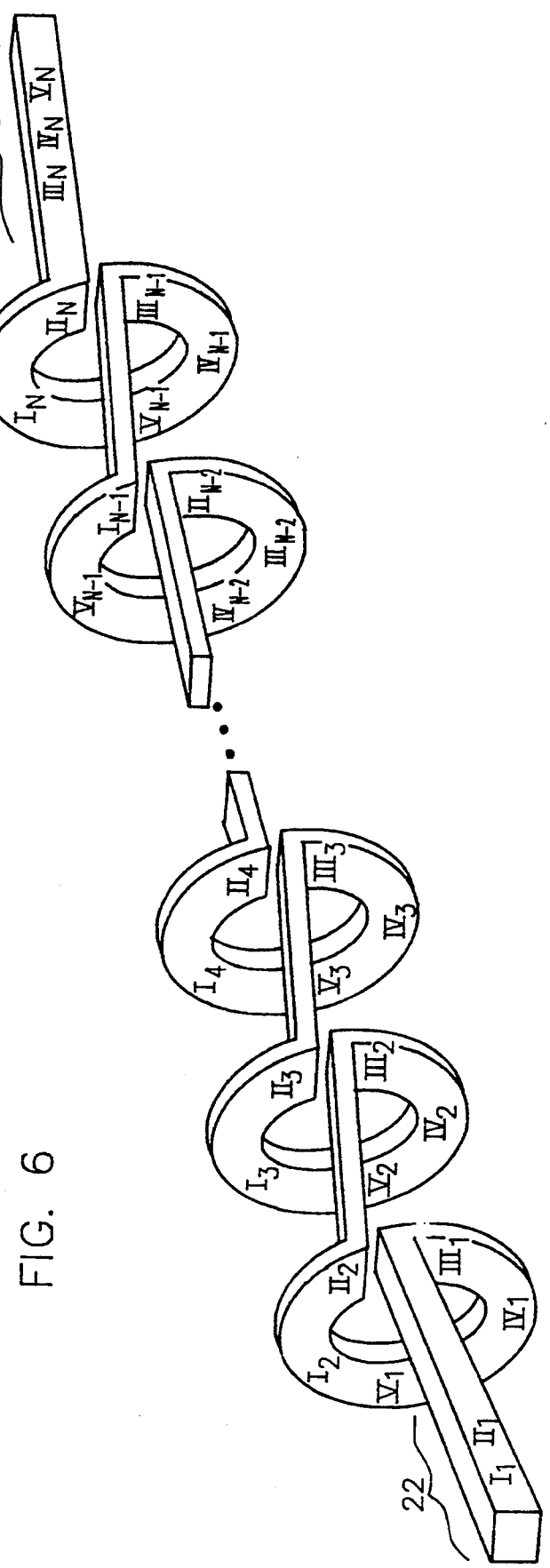
FIG. 6 is a diagram similar to FIG. 5 depicting movement of two instructions.

The manner in which the adjustments shown in FIG. 5 and FIG. 6 can lead to elimination of delay cycles can be illustrated with regard to the example loop discussed above. After reordering in the manner depicted in FIG. 6, the loop instructions which are presented to the scheduler will be the following.

| LOOP: | |
|---|---|
| add.d | $f6,$f4,$f12 |
| < 3 cycle interlock > | |
| sdc1 | $f6,-8(r3) |
| bne | r3,r2,LOOP |
| ldc1 | $f4,0(r3) |
| addiu | r3,r3,8 |

As noted above, in the unadjusted loop, the scheduler was only able to fill a single one of the three delay slots since there were not sufficient independent instructions to insert into the delay slots. The situation is different after adjustment because there are now two additional independent instructions, ldc1 and addiu, which can be used to fill the delay slots. In the original loop, these instructions could not be used to fill the delay slot since these were from the same iteration and thus the dependency among the instruction prevented their being moved in this fashion. However, as depicted in FIG. 6, each of the iterations 12a, 12b, 12c, 12d, has instructions that were originally from two different iterations. Thus, the (adjusted) first iteration contains instructions $III_1$, $IV_1$, $V_1$ from the original first iteration, and $I_2$ and $II_2$ from the original second iteration. Because $I_2$ and $II_2$ are not dependent on the other instructions in the first iteration, they can be moved into the delay slots. Thus, the scheduler has available to it additional instructions which can be employed for filling delay slots. After the scheduler operates on the adjusted loop, the loop body will have the following form.

| LOOP: | |
|---|---|
| add.d | $f6,$f4,$f12 |
| ldc1 | $f4,0(r3) |
| addiu | r3,r3,8 |
| bne | r3,r2,LOOP |
| sdc1 | $f6,-8(r3) |

Thus, it can be seen that all delay slots have been filled, which results in an increase in efficiency during execution of the loop.

As shown in FIG. 6, the adjustment made to the loop results in some of the original loop instructions being moved outside the loop. These form a group of instructions preceding the loop, which can be referred to as the prologue 22 and a group of instructions 24 following the loop which can be referred to as the epilogue. It will be noted that the prologue and the epilogue together account for all instructions in a single iteration of the loop, i.e., instructions I, II, III, IV, V (albeit different iterations thereof) are found in the combination of the prologue 22 and the epilogue 24. The complete instruction stream for the original loop after adjustment of FIG. 6 and operation by the scheduler is as follows.

| LOOP: | | |
|---|---|---|
| addiu | r3,r3,8 | |
| beq | r3,r2,LEND | prolog |
| ldc1 | $f18,-8,(r3) | |
| LBEG: | | |
| add.d | $f16,$f18,$f12 | |
| ldc1 | $f18,0(r3) | |
| addiu | r3,r3,8 | loop body |
| bne | r3,r2,LBEG | |
| sdc1 | $f16,-16(r3) | |
| LEND: | | |
| add.d | $f16,$f18,$f12 | |
| < 3 cycle interlock > | | epilog |
| sdc1 | $f16,-S(r3) | |

In general, there is no guarantee that any particular adjustment of a given loop will enable the scheduler to achieve improved results, i.e., to fill more delay slots. For example, the first adjustment, depicted in FIG. 5, would permit the scheduler to fill two delay slots but leave one delay slot unfilled. One embodiment of the invention includes providing several different adjustments or circular scheduling to the scheduler and using, for execution, the configuration which produces the best results. For example, using the above example, the original loop structure would be adjusted as shown in FIG. 5 and presented to the scheduler which would then produce a loop structure that has only one delay slot unfilled. The original loop structure would also be adjusted as depicted in FIG. 6 which would then be presented to the scheduler and, as noted above, the scheduler would produce a loop structure which was able to fill all delay slots. Since filling all delay slots represents an improved result over filling all but one delay slot, the loop structure resulting from applying the scheduler to the adjustment shown in FIG. 6 would be used during execution of the program.

Thus, in this embodiment of the present invention, as opposed to previous optimization approaches, the technique involves finding improvements in efficiency, not being limited to seeking only the optimal solution. This approach is beneficial since sometimes the optimal solution may be infeasible (e.g., because insufficient registers are available).

In general, not every instruction in a loop is available for moving or "circling". According to one embodiment of the invention, before instructions are moved, the loop is analyzed to determine which instructions are candidates for moving. One method for identifying candidate instructions involves analysis of the directed acyclic graph or DAG of the loop. In graphic form, the directed acyclic graph of a loop shows each instruction and includes a line connecting an instruction to an instruction from which it depends. FIG. 7 shows the DAG for the example loop instructions I, II, III, IV, V. As shown in FIG. 7, the instructions in the loop can be considered as falling into two groups. The first group 30 includes those instructions which do not depend from any other instructions. These are referred to as the roots of the DAG. The second group 32 includes those instructions which depend from other instructions. According to this embodiment of the invention, the roots of the DAG are the instructions which are candidates for circling.

Movement of instructions from one iteration to another will also require noting inter-iteration dependencies. According to the described method, the iteration number of each instruction is the number of times it has been circled. Whether an edge needs to be inserted in the DAG for any pair of instructions from different iterations can be determined by analyzing the code. For example, an instruction which makes reference to the iteration number, augmented by one or more, will typically involve inter-iteration dependency. Data dependency information will normally be available based on earlier passes of the compiler through the code.

In general terms, moving an instruction as depicted permits the scheduler to generate a better schedule for several reasons. First, instructions close to the top of the loop (successors of the roots of the DAG) now become roots of the DAG of the modified loop. They can thus be scheduled earlier, eliminating stalls at the start of the loop body. Further, the moved instruction can be scheduled before some of the instructions at the end of the loop body if there are no dependencies between them. This effectively utilizes stalled cycles that are usually present toward the end of the loop.

Although in the examples of FIGS. 5 and 6, the instructions were circled in order of their appearance in the original loop (i.e., first I then II). There is no general requirement that this be done. I.e., it is possible to circle instruction II without circling instruction I. In such a case the first iteration would have the form $I_1$, $III_1$, $IV_1$, $V_1$, $II_2$. It is possible to select which of the candidates to move (or, in the case of multiple trials, which to move first) on a random basis. However, according to one embodiment of the invention, various techniques, such as heuristic-based techniques are used for selecting the instructions which are more likely to produce the desired improvement of efficiency. As examples of heuristic-based rules for selection, one embodiment provides for moving instructions preferentially that are on longer paths in the DAG. In general these are more likely to cause stalls toward the end of the loop. As another example, candidate instructions can be selected based on the resources which they use. For example, instructions are selected which use resources that tend to create bottlenecks in the loop. As an illustration, the floating point multiply unit may represent a resource that causes bottlenecks, if stalls often result from an instruction waiting for the floating point multiply unit to be free. Thus, higher priority in circling may be given to candidate instruction which use the multiply unit (such as multiply instructions).

According to one embodiment of the invention, it is not necessary that a circled instruction must be moved to the end or bottom of the loop. The important aspect is that a given iteration of the loop (i.e., the block on which the scheduler works and having instructions which the scheduler can rearrange) is reconfigured so that the number of instructions which can be moved, such as independent instructions, is increased. For example, by moving instruction $I_2$ into the first iteration, it becomes available for movement into the delay slot. Although $I_1$ could not have been moved into the delay slot because of dependencies, $I_2$ is free from dependencies which would prevent movement into the delay slots.

Figure 8:
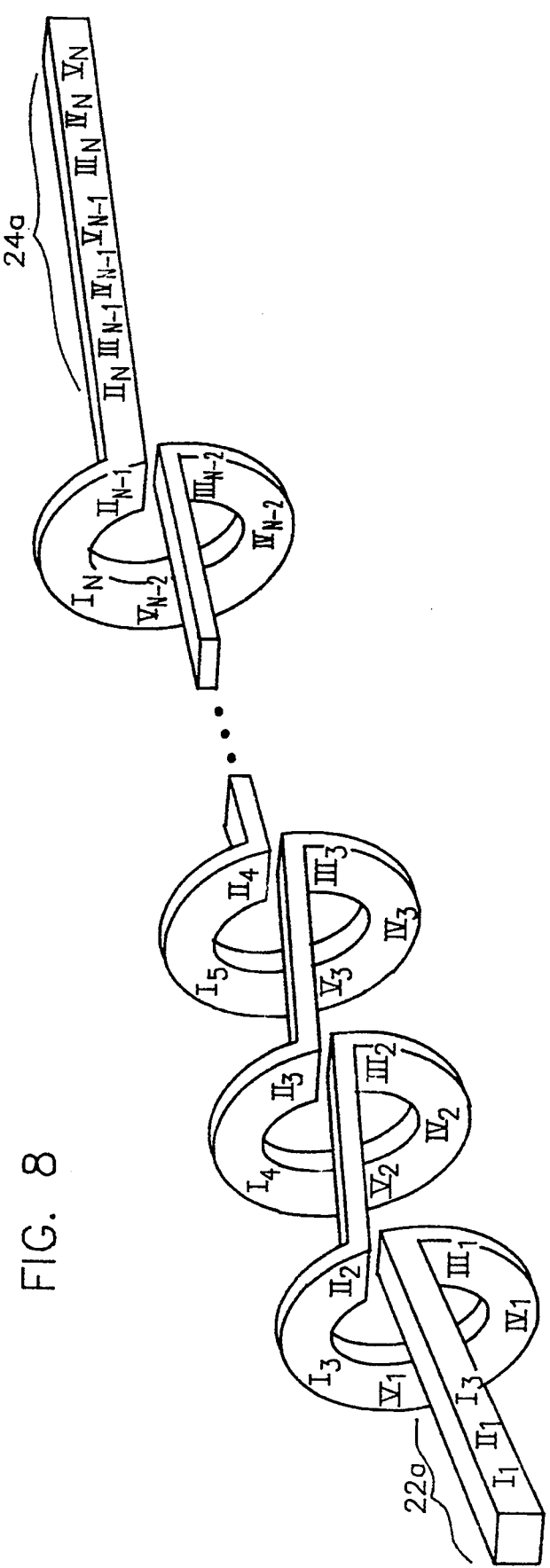
FIG. 8 is a diagram, similar to FIG. 5, but showing movement of instructions across more than one iteration of a programming loop.

As noted above, the present invention includes trying several circlings or movements of instructions in an attempt to find a configuration such that the scheduler can reduce or, preferably eliminate, unfilled delay slots. The circling is not limited to movement of instructions among adjacent iterations. FIG. 8 depicts a configuration in which instruction I has been circled twice, i.e., in which the first iteration has been adjusted to contain not $I_2$ but $I_3$. Just as circling once resulted in reducing the number of loop iterations by one, circling twice as shown in FIG. 8 reduces the number of loop iterations by 2. I.e., if the original loop had N iterations, circling once will result in a loop having N−1 iterations and circling twice will result in a loop having N−2 iterations. The instructions from the eliminated iterations are moved to prologue 22a and epilogue 24a. For a loop that has been circled k times, there are k prologues and k epilogues. The loop body is executed N−k times.

Preferably, circling twice (or more) would only be undertaken if circling once of all candidate instructions (all roots of the DAG) failed to fill as many delay slots as desired. In one embodiment, the procedure of circling candidate instructions, as many times as possible, can continue until all delay slots are filled and thus no further improvement is possible. However, it may be impractical to always continue until all delay slots are filled. This could conceivably slow the compiler to a point where reduction in compiler speed outweighs any benefit from increased execution speed. Thus, it may be preferable to define a predetermined number of circlings after which no further circlings will be attempted. It may also be that even after all circlings have been exhausted, unfilled delay slots still remain. According to one embodiment of the invention, the scheduler will then be applied to whichever configuration has the lowest number of unfilled delay slots.

In addition to the limit on compiler time, there may also be a limit on the number of registers. Typically, as instructions are moved across iteration boundaries, registers will be needed to maintain the information from one iteration to the next. When the number of registers available for this task is limited, it is possible that circling of instructions will have to terminated in response to exhausting the registers available for this purpose.

According to yet another embodiment, further circlings are terminated in response to detection of an increasing trend in the number of unfilled delay slots. For example, it might be found that a first number of circlings each results in initial filling of delay slots but that subsequent circlings provides undesired increase in the number of unfilled delay slots. According to this embodiment of the invention, further circling of instructions would cease once this type of undesirable trend was detected and the configuration (among those tested) having the smallest number of unfilled delay slots would be provided to the scheduler. This embodiment carries with it the risk that the number of delay slots in the selected configuration might represent only a local minimum and that further circling (beyond the detected undesirable trend) might result in a reversal of the trend and even greater reduction of unfilled delay slots.

Several techniques can be used in conjunction with the instruction circling technique to enhance the effectiveness of the circling technique. For example, several techniques are available which provide a loop DAG having a greater number of roots or fewer dependencies. Typically, portions of the compiler prior to the scheduler can generate information on loop dependency which can be used to reduce the number of inter-iteration dependencies. That is, the compiler may be able to indicate that there is no dependency in a situation in which the scheduler might otherwise indicate there is a dependency. By using this information, instructions can be moved that otherwise would not be moved. Register renaming involves changing the definition and use of registers to reduce data dependency. For example, in a situation in which a single register has serial definitions and uses, by using two different registers for the serial definitions and uses, a dependency in the loop might be eliminated.

Figure 9B:
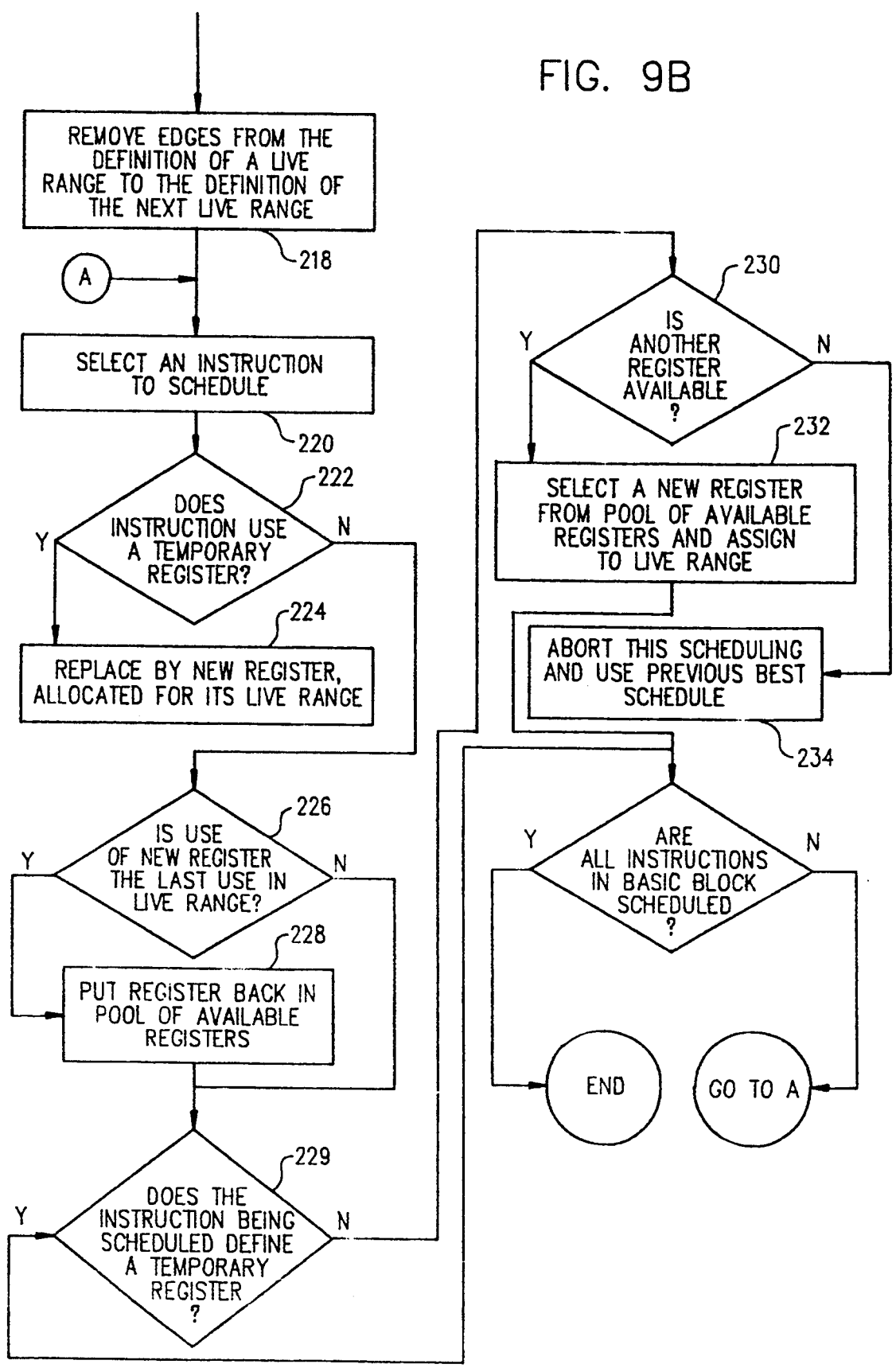
FIG. 9 is a schematic diagram depicting the flow of operations according to one embodiment of the present invention.

FIG. 9 depicts a process for register renaming. Register renaming is discussed generally in J. Ferante "What's in a Name, or the Value of Renaming for Parallelism Detection and Storage Allocation" *Technical Report No.* 12157, *IBM Thomas J. Watson Research Center*, January 1987; J. C. Dehnert, et al. "Overlapped Loop Support in the Cudra 5" *Proceedings Third International Conference on Architectural Support for Programming Language and Operating systems*, April 1989 and R. M., Tomasulo "An Efficient Algorithm for Exploring Multiple Arithmetic Units" *IBM Journal of Research and Development* 1967, all incorporated herein by reference to the extent needed for understanding the present invention. It is considered likely that the benefit from combining circular scheduling with register renaming exceeds the sum of the benefit from each technique used alone.

As depicted in FIG. 9, a global data flow analysis is undertaken to compute the set of registers which are "live" at the end of each basic block 210. Registers are identified that are not live at the beginning and end of the basic block 212. This includes registers that are used as temporaries within the basic block as well as registers that are unused. This forms the pool of registers available for register renaming. The live ranges for the temporary registers within the basic block are identified 214. This is done while building the DAG for the basic block. While building the DAG, dependencies between different live ranges are ignored. In other words, edges from the uses of a live range are not added to the definition of the next live range 216. Also, edges are removed from the definition of a live range to the definition of the next live range 218.

An instruction to be scheduled is selected 220. The selection is preferably based on heuristic or emperical grounds. If the instruction uses a temporary register 222, that register is replaced by the new register allocated for its live range 224. If the use is the last use in the live range 226, the new register is put back in the pool of available registers 228. If the instruction being scheduled defines a temporary register 229 and another register is available 230, a new register is chosen for it from the pool of available registers 232. If there are no more registers available for renaming, the scheduling algorithm is aborted 234. In this case, an earlier schedule that was the best so far is used. If there are instructions in the basic block remaining to be scheduled, the process is repeated beginning with the selection of an instruction to schedule 220.

Figures 10, 10A:
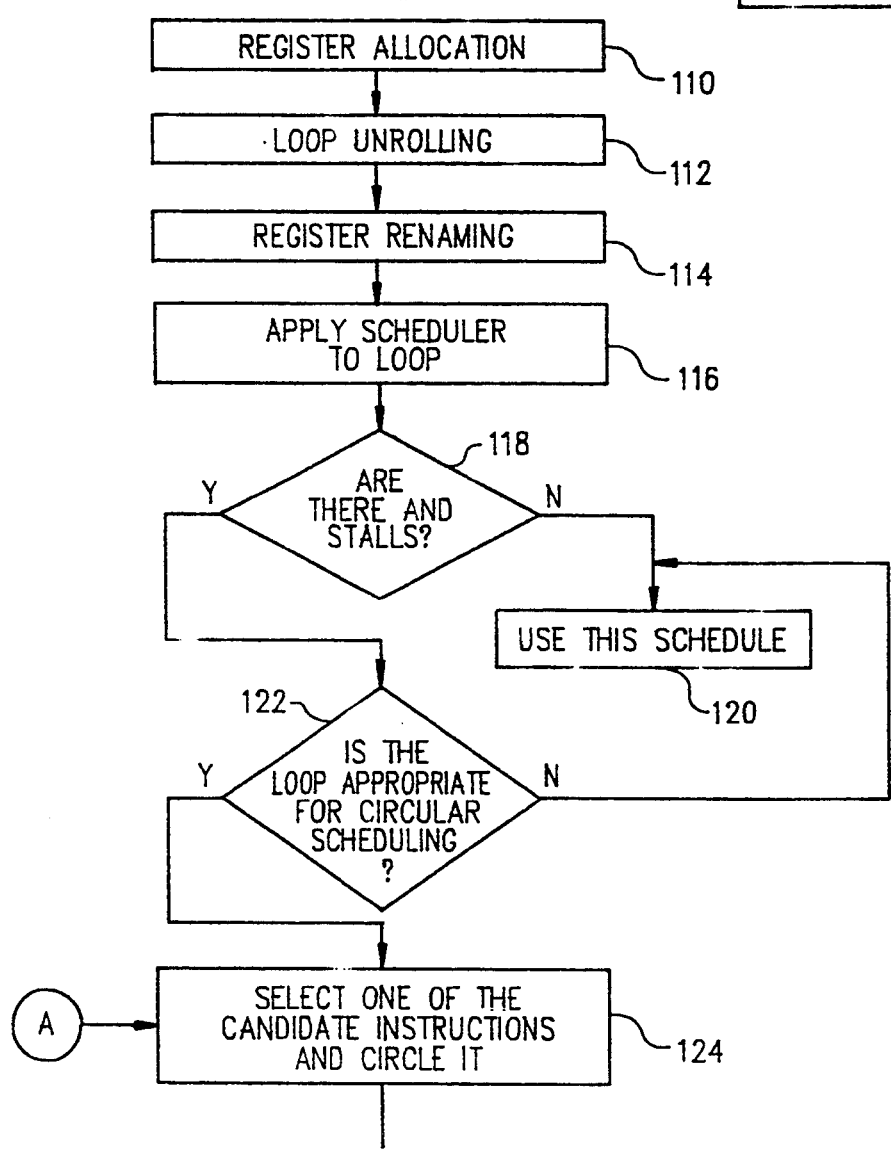
FIG. 10 is a schematic diagram depicting the flow of operations according to one embodiment of the present invention.

FIG. 10 depicts a flow chart of one process which can be used according to the present invention. According to this process, the compiler is first applied, preferably including routines for register allocation 110, loop unrolling 112 and register renaming 114. It is preferable to perform register allocation prior to circling instructions so that it can known that there are sufficient registers for the circular scheduling that is done. This will avoid having to use techniques such as register spill if insufficient registers are available. Loop unrolling the technique of, e.g., changing a loop having N iterations into a loop having N/2 iterations, each iteration containing the instructions from two of the former loop iterations. Loop unrolling is described, generally in J. 0. Hennessy, et al. "Computer Architecture, A Quantitative Approach", 1990.

The scheduler is applied to a programming loop in the program 116. After the scheduler is applied, the result is analyzed to determine whether there are any stalls such as delay slots 118. If there are no stalls, further improvement is not possible and this schedule should be used 120. If there are stalls in the loop, the loop is analyzed to determine whether it is appropriate for circular scheduling. In general circular scheduling will require the presence of at least one independent instruction, typically the root of the DAG for the loop. If desired, further constraints can be placed on circular scheduling (although these constraints are not theoretically a requirement). For example, circular scheduling can be applied only to single basic block loops with no procedure calls. Circular scheduling can be applied only to loops with a loop index that is incremented once inside the loop. These restraints limit the complexity of the circular scheduling algorithm. If it is determined that the loop is not appropriate for scheduling, the schedule already provided is used 120.

If circular scheduling is appropriate, one of the candidate instructions is selected and circled 124. The basis for selecting, as noted above, can be random or can be based on heuristic or empirical principles such as those described above. After the candidate instruction is circled, the scheduler is applied to the modified loop 126. After the scheduler completes it work, the number of stalls in the resultant schedule is calculated 128. It is determined whether the resultant schedule has any stalls 130. If there are no stalls, the schedule cannot be improved and this schedule should be used 132. If stalls are still present, it is determined whether there are more instructions available for circling 134. If instructions are available, it is determined whether the limit for circling has been reached 136. Checking for the limit on circling is an optional step. It is possible, as discussed above, to continue circling until no more instructions are available. The limit for circling, if it is used, can be based on the number of circles completed, the trend in results, or other criteria. If instructions are available and a limit has not been reached, the process is repeated beginning with selecting one of the candidate instructions and circling it 124. However, if no more instructions are available or if the circling limit has been reached, then the result from all of the different schedules generated for the loop are reviewed and the best schedule among those generated thus far (i.e., the schedule with the fewest stalls) is selected as the schedule to use 138. If any circlings have been done, it will be necessary to create the prologue and epilogue blocks 140 as discussed above. Also, as discussed above, circling results in reducing the number of iterations of the loop and the loop body is adjusted to reflect the reduction and iterations 142.

The performance improvements obtained using the circular scheduling procedure was evaluated using benchmarks. The benchmarks were run with full optimization with and without circular scheduling and register renaming. Table 2 shows the percentage improvement in each case. The tests were run on two systems with different floating point implementations. The two systems were the MIPS M/2000 (R3000, R3010) and the MIPS RC 6280 (R6000, R6010). The results of Table 2 are based on running the Livermore loops benchmarks described in McMahon, et al. "Fortran CPU Performance Analysis" *Lawrence Livermore Laboratories* 1972. Some of the kernels showed no improvement because they were already being optimally scheduled. Kernels 15, 16 and 17 had conditional statements in the loop and thus were not circular scheduled. Kernel 22 calls an external library routine and was not circularly scheduled. For a few kernels there is a slight degradation in performance, even though cycle counts are either the same or better. This is caused by scheduling of several loads together. This exposes some data cache misses that were hidden behind some floating point operations earlier.

TABLE 2

| Kernal | Percentage Improvement | |
|---|---|---|
| | R3010 | R6010 |
| 1 | 30 | 38 |
| 2 | 4 | 0 |
| 3 | 3 | 2 |
| 4 | 0 | 17 |
| 5 | −1 | −2 |
| 6 | −2 | −5 |
| 7 | 36 | 34 |
| 8 | 17 | 15 |
| 9 | 43 | 53 |
| 10 | 0 | 0 |
| 11 | 0 | 6 |
| 12 | 0 | 23 |
| 13 | 0 | −2 |
| 14 | 9 | 13 |
| 15 | 1 | 0 |
| 16 | 1 | 0 |
| 17 | 0 | 0 |
| 18 | 30 | 17 |
| 19 | 2 | −5 |

TABLE 2-continued

| Kernal | Percentage Improvement | |
|---|---|---|
| | R3010 | R6010 |
| 20 | 3 | 0 |
| 21 | 2 | 42 |
| 22 | 0 | 0 |
| 23 | 33 | 19 |
| 24 | 1 | 2 |

Table 2: Performance of Livermore Loops (DP)

Performance was analyzed for some other benchmarks also. For these benchmarks, cycle times were measured instead of the actual run times.

TABLE 3

| Benchmark | % Improvement | |
|---|---|---|
| | R3010 | R6010 |
| Linpack | 0 | 23 |
| la400 | 8.6 | 28 |
| tomcatv (SPEC) | 17.3 | 18.2 |
| nasa7 (SPEC) | 5.4 | 12.5 |
| doduc (SPEC) | 3.1 | 2.2 |
| fpppp (SPEC) | 2.4 | 2.3 |

Table 3: Performance of Common Benchmark

For the "Linpack" benchmark, the existing scheduler already generates an optimal schedule for the R3010. The improvements are due to both circular scheduling and register renaming. The compile time for the above benchmarks increased between 5% and 25% for the programs analyzed. The increase in compile time is generally proportional to the amount of benefit derived. For programs with fewer floating-point code and loops, the degradation and compile time is much less. Of course, the performance improvement is also small for these programs. For all the benchmarks, loop unrolling was performed before circular scheduling. Since unrolling removes a large number of the floating point interlocks, the gains from software pipelining are not as large as they would have been if loop unrolling was not done. However, the results of applying both optimizations are better than applying either of them alone.

FIG. 11 depicts, in general, a computer 310 which can be used in connection with the present invention. A CPU 311 is connected to a memory management unit 312 providing for processor I/O 314 which communicates with a floating point unit 316 and a translation lookaside buffer 318 which also communicates directly with the CPU 311. The translation lookaside buffer 318 and the floating point unit 316 are connected by an instruction bus 320 and a data bus 322. The instruction bus 320 communicates with an instruction cache 324 and the data bus 322 communicates with a data cache 326. The memory management unit 312 communicates with a tag cache 328. The operation of all these items is well known in the art. The method of the present invention is preferably implemented in instructions provided in a compiler program. The invention involves using the apparatus of FIG. 11 to execute a compiler program such as by using the central processing unit 311 coupled to the instruction cache 324 via the memory management unit 312.

In light of the above description, a number of advantages of the present invention can be seen. The present invention provides a simple and feasible way to extend the capabilities of a basic-block scheduler. The invention yields improvement over already optimized code from a production quality compiler, without adding substantially to the compilation time and without requiring substantial modification of the scheduler.

A number of modifications and variations of the invention can also be used. Although the discussion above is in terms of filling delay slots, the invention can be generalized to discussion of what types of operations can be performed or executed concurrently. The types of concurrent operations permitted will vary depending on the configuration of the computer execution unit. As an example, in the MIPS R6010 floating point architecture, loads and stores can execute concurrently with floating point operations, provided they do not modify or use the result registers of the executing operation. Fixed point operations may execute concurrently with floating point operations. The floating point operations can be overlapped with each other in certain circumstances.

Although the example above describes the invention in the context of a loop which has only a single basic block, the present invention can also be applied to loops with multiple basic blocks. It is possible in this situation to move an instruction from one basic block into another basic block. Because the scheduler typically works on basic block units, it is possible that this movement will result in a better schedule since there are more instructions in one of the basic blocks for the scheduler to work on.

Although the present invention is useful in the context of scalar, reduced instruction set computer (RISC) processors, the invention can also be used with a very large instruction word (VLIW) architecture. In this case, it would typically be preferable to move instructions from more than one iteration out of the basic block.

The present invention can also be used in connection with global scheduling. Under normal scheduling, the scheduler works only a single basic block at a time. Using global scheduling, the scheduler can move an instruction from one basic block to another. For example, using a global scheduler, one can pick an instruction from anywhere in the loop and move it across the basic block boundaries. By moving an instruction to a new position, it becomes available for movement by the scheduler anywhere into the loop.

Although the present invention has been described by way of a preferred embodiment and certain variations and modifications, other variations and modifications can also be used, the invention being defined by the following claims.

What is claimed is:

1. A computer implemented method for improving loop execution performance in executing a computer program, said loop comprising a first plurality of computer instructions and salad computer program including instructions for sequentially executing a number of iterations of said loop wherein said loop has a first iteration, the method comprising:
   (a) identifying, among said loop instructions, at least one independent instruction which does not require previous execution of another loop instruction in the same iteration;
   (b) moving a first iteration of said at least one independent instruction to a location prior to said loop;
   (c) moving second and subsequent iterations of said at least one independent instruction to a preceding iteration;
   (d) moving all unmoved instructions in the last iteration of said loop to a location after said loop;
   (e) reducing the number of iterations in the loop by one;
   wherein performing steps (a) through (e) results in providing at least one of said first plurality of instructions as an independent instruction; and
   (f) moving said at least one of said first plurality of instructions into a delay slot produced by another loop instruction.

2. A method, as claimed in claim 1, further comprising repeating steps (a) through (c) at least once before performing step (f).

3. A method, as claimed in claim 1, further comprising:
   moving the second iteration of said at least one independent instruction to a location prior to said loop;
   moving third and subsequent iterations of said at least one independent instruction to the preceding iteration;
   moving, after step (d), all unmoved instructions in the last iteration of said loop to a location after said loop, and reducing the number of iterations in the loop by one.

4. A method, as claimed in claim 1, wherein said step of identifying includes identifying said at least one independent instruction as an instruction which is a root of a directed acyclic graph of said loop.

5. A method, as claimed in claim 1, wherein step (f) is performed by a scheduler.

6. A method, as claimed in claim 1, further comprising at least partially unrolling said loop prior to performing steps (a) through (f)

7. A method, as claimed in claim 1, wherein said step identifying comprises identifying said independent instruction as an instruction which is on a path of the directed acyclic graph of the loop which is longer than at least one other path of a directed acyclic graph.

8. A method, as claimed in claim 1, wherein said step of identifying comprises identifying said independent instruction as an having a greater latency than at least one other ion in the loop.

9. A method, as claimed in claim 1, further comprising repeating at least steps (a) through (c) until all delay slots in the loop are filled.

10. A method, as claimed in claim 1, further comprising:
    repeating at least steps (a) through (c) a number of repetitions, each petition defining, a loop configuration;
    determining how many unfilled delay slots are in the loop after each of plurality of said repetitions to define a number of unfilled delay slots in each repetition;
    selecting the loop configuration after one of said repetitions as a loop configuration to be executed, the number of unfilled delay slots in said one of said repetitions being less that the number of delay slots in at least another of said repetitions.

11. A method, as claimed in claim 10, wherein the number of unfilled delay slots in said one of said repetitions is no greater than the number of unfilled delay slots in any other of said repetitions.

12. A method, s claimed in claim 1 wherein said loop instructions include at least two register references, and further comprising:
    renaming at least one register referenced in said loop.

13. In a computer, apparatus for improving loop execution performance in executing a computer program, said loop comprising a first plurality of computer instructions and said computer program including instructions for sequentially executing a number of iterations of said loop wherein said loop has a first iteration, the apparatus comprising:
   (a) means for identifying, among said loop instructions, at least one independent instruction which does not require previous execution of another loop instruction in the same iteration;
   (b) means coupled the said means for identifying, for moving a first iteration of said at least one independent instruction to a location prior to said loop;
   (c) means, coupled to said means for identifying, for moving second and subsequent iterations of said at least one independent instruction to a preceding iteration;
   (d) means, coupled to said means for identifying, for moving all unmoved instructions in the last iteration of said loop to a location after said loop;
   (e) means, coupled to said means for identifying, for reducing the number of iterations in the loop by one;

wherein means (a) through (e) provide at least one of said first plurality of instructions as an independent instruction;
   (f) means, coupled to said means for identifying, for moving said at least one of said first plurality of instructions into a delay slot produced by another loop instruction.

14. Apparatus, as claimed in claim 13, wherein means (a) through (f) includes a central processing unit coupled to a memory for executing a compiler program.

15. A computer-implemented method for use in a compiler program, the compiler program being a program for converting source code of a computer program into executable object code, the executable object code including a plurality of instructions executable by a computer, the computer having a plurality of allocatable registers, the compiler including a scheduler for receiving unscheduled object code and establishing the order of execution of executable object code instructions, the method being for use in increasing the efficiency of execution of the executable object code by decreasing the number of unfilled delay slots in the executable object cede, the method comprising:
   (a) allocating said allocatable registers for use during execution of the executable object code;
   (b) renaming at least one of said allocatable registers such that first and second tasks that would otherwise use one register for two sequential tasks will instead use two registers, thus eliminating a dependency between the tasks;
   (c) submitting a first portion of said unscheduled object code, which defines a programming loop having a plurality of iterations, to the scheduler, to produce a first scheduled loop code, having a plurality of instructions, said first scheduled loop code having a loop beginning and a loop end;
   (d) determining if there are unfilled delay slots in said first scheduled loop code;
   (e) when there are no unfilled delay slots in said first scheduled loop code, using said first scheduled loop code as part of the executable object ccode;
   (f) when there are unfilled delay slots in said first scheduled loop code, selecting a first, independent instruction from among the instructions in the first scheduled loop code, an independent instruction being an instruction which does not require a previous instruction in the loop to be executed first;
   (g) moving a first iteration of the selected first independent instruction to a position before said loop beginning and moving each subsequent iteration of the selected first independent instruction a position in an immediately previous iteration and moving the last iteration of all instructions except for said selected first independent instruction to a position after said loop end, to produce a first modified object code;
   (h) submitting said first modified object code to the scheduler to produce a second scheduled loop code;
   (i) determining if there are unfilled delay slots in said second scheduled loop code;
   (j) when here are no unfilled delay slots in said second scheduled loop code, using said second scheduled loop code as part of the executable object code;
   (k) when there are unfilled delay slots, and if there are previously unmoved independent instructions in the second scheduled loop code, selecting a second independent instruction which is previously unmoved;
   (l) moving the first iteration of the selected second independent instruction to a position before said loop beginning and moving each subsequent iteration of the selected second independent instruction to a position in the immediately previous iteration to produce a second modified object code;
   (m) submitting the second modified object code to the scheduler to produce a third scheduled loop code;
   (n) selecting one among a plurality of scheduled loop codes as a preferred scheduled loop code, said plurality of scheduled loop s including at least said first, second and third scheduled loop codes, said preferred scheduled loop code having no more unfilled delay slots than any of the other of said plurality of scheduled loop codes, and using said preferred scheduled loop code as part of the executable object code.

* * * * *